United States Patent
Brady et al.

(10) Patent No.: US 6,329,915 B1
(45) Date of Patent: Dec. 11, 2001

(54) RF TAG HAVING HIGH DIELECTRIC CONSTANT MATERIAL

(75) Inventors: Michael J. Brady, Brewster; Paul A. Moskowitz, Yorktown Heights; Dah-Weih Duan, Yorktown Heights; Ali Afzali-ardakani, Yorktown Heights; Christopher A. Field, Yorktown Heights; Peter R. Duncombe, Peekskill, all of NY (US)

(73) Assignee: Intermec IP Corp, DE (US)

( * ) Notice: Subject to any disclaimer, the term of this patent is extended or adjusted under 35 U.S.C. 154(b) by 0 days.

(21) Appl. No.: 09/296,193

(22) Filed: Apr. 24, 1999

Related U.S. Application Data

(63) Continuation-in-part of application No. 09/224,430, filed on Dec. 31, 1998, now abandoned, which is a continuation-in-part of application No. 09/191,642, filed on Nov. 13, 1998, and a continuation-in-part of application No. 09/191,641, filed on Nov. 13, 1998.
(60) Provisional application No. 60/078,287, filed on Mar. 17, 1998, provisional application No. 60/078,220, filed on Mar. 16, 1998, provisional application No. 60/077,879, filed on Mar. 13, 1998, and provisional application No. 60/070,117, filed on Dec. 31, 1997.

(51) Int. Cl.[7] .................................................. G08B 13/14
(52) U.S. Cl. ..................... 340/572.1; 340/572.4; 340/572.7; 340/572.8; 343/873; 343/911 R; 343/700 MS
(58) Field of Search ............................. 340/572.1, 572.2, 340/572.4, 572.7, 572.8, 825.54; 343/785, 864, 873, 911 R, 700 MS

(56) References Cited

U.S. PATENT DOCUMENTS

| | | | |
|---|---|---|---|
| 3,737,904 | * 6/1973 | Mori et al. | 342/5 |
| 4,075,632 | * 2/1978 | Baldwin et al. | 343/6.8 R |
| 4,739,328 | * 4/1988 | Koelle et al. | 342/44 |
| 4,816,839 | * 3/1989 | Landt | 343/795 |
| 5,030,807 | * 7/1991 | Landt et al. | 235/375 |
| 5,119,104 | * 6/1992 | Heller | 342/450 |
| 5,305,008 | * 4/1994 | Turner et al. | 342/44 |
| 5,430,441 | * 7/1995 | Bickley et al. | 340/825.51 |
| 5,479,172 | * 12/1995 | Smith et al. | 342/51 |
| 5,528,222 | * 6/1996 | Moskowitz et al. | 340/572 |
| 5,606,323 | * 2/1997 | Heinrich et al. | 342/51 |
| 5,608,417 | * 3/1997 | De Vall | 343/895 |
| 5,776,278 | * 7/1998 | Tuttle et al. | 156/213 |
| 5,786,626 | * 7/1998 | Brady et al. | 257/673 |
| 5,787,174 | * 7/1998 | Tuttle et al. | 380/23 |
| 5,850,187 | * 12/1998 | Carrender et al. | 340/825.54 |
| 5,909,624 | * 6/1999 | Yeager et al. | 438/396 |
| 5,945,938 | * 8/1999 | Chia et al. | 342/42 |
| 5,963,177 | * 10/1999 | Tuttle et al. | 343/872 |
| 5,972,156 | * 10/1999 | Brady et al. | 156/280 |
| 5,995,048 | * 11/1999 | Smithgall et al. | 343/700 MS |
| 6,043,745 | * 3/2000 | Lake | 340/572.1 |

\* cited by examiner

*Primary Examiner*—Daniel J. Wu
*Assistant Examiner*—Toan Pham
(74) *Attorney, Agent, or Firm*—Rodney T. Hodgson

(57) ABSTRACT

A radio frequency (RF) transponder (RF tag) is proposed, where a high dielectric constant material is used in operative cooperation with a tag antenna so that the distance of the tag antenna from conducting or absorbing surfaces may be reduced, and so the tag dimensions may be reduced.

19 Claims, 2 Drawing Sheets

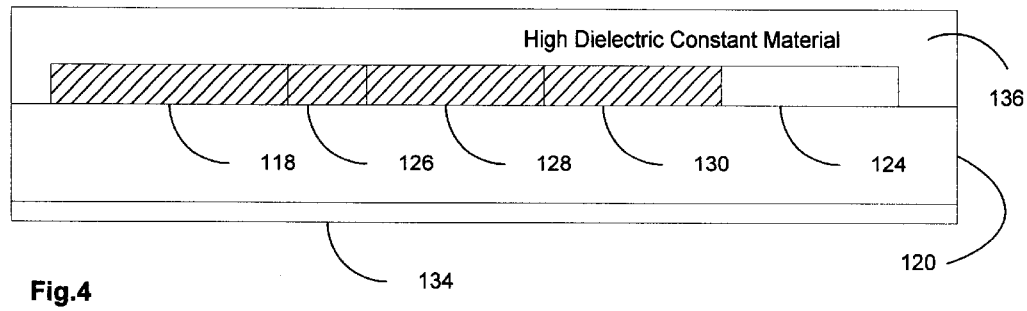
Fig.4
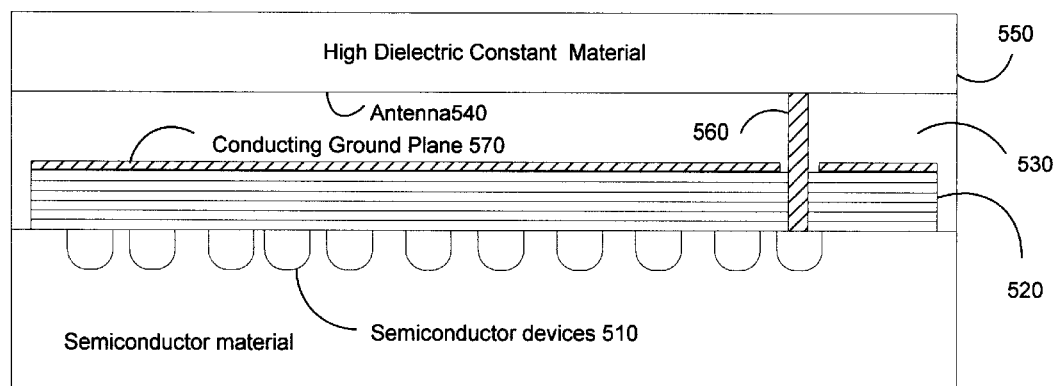
Fig. 5
Fig. 6
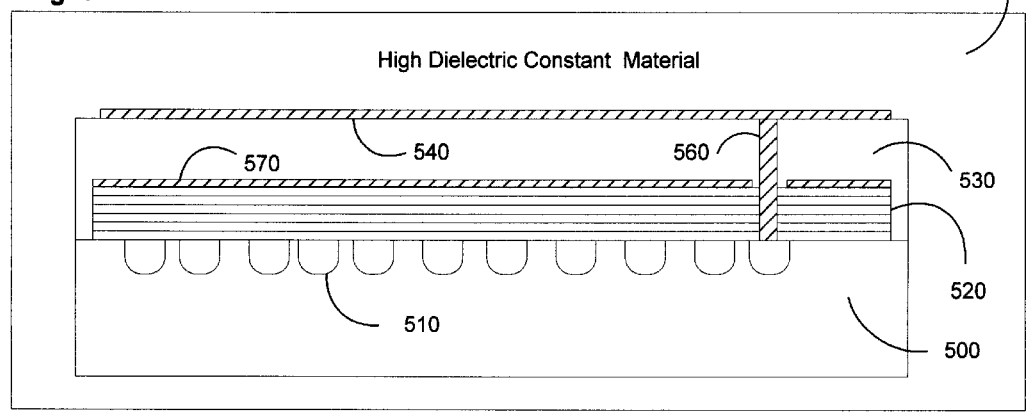

RF TAG HAVING HIGH DIELECTRIC CONSTANT MATERIAL

CROSS-REFERENCE TO RELATED APPLICATIONS

The present application is a continuation-in-part of U.S. patent application Ser. No. 09/224,430, by Brady et al., filed Dec. 31, 1998, now abandoned entitled RF transponder for metallic surfaces, which claims the benefit of Provisional Applications No. 60/070,117 filed Dec. 31, 1997, (Attorney Docket No. YO895-0329P1), No. 60/077,879 filed Mar. 13, 1998 No. 60/078,220 filed Mar. 16, 1998 and No. 60/078,287 filed Mar. 17, 1998. The 09/224,430 application is a continuation-in-part of applications No. 09/191,642 filed Nov. 13, 1998 in the names of Kodukula, Duan, Brady, Feild and Moskowitz, Express Mail Label No. EL 158 487 275 US, and No. 09/191,641 filed Nov. 13, 1998 in the names of Kodukula, Duan and Brady, Express Mail No. EL 158 487 235 US,. All of the above provisional and nonprovisional applications are hereby incorporated herein by reference in their entireties including drawings and appendices and referenced U.S. Patent applications.

FIELD OF THE INVENTION

The field of the invention is the field of Radio Frequency (RF) transponders (RF Tags) which receive RF electromagnetic radiation from a base station and send information to the base station by modulating the load of an RF antenna.

RELATED PATENTS AND APPLICATIONS

Related U.S. Patents assigned to the assignee of the present invention include: U.S. Pat. Nos. 5,521,601; 5,528,222; 5,538,803; 5,550.547; 5,552,778; 5,554,974; 5,563,583; 5,565,847; 5,606,323; 5,635,693; 5,673,037; 5,680,106;5,682,143; 5,729,201; 5,729,697;5,736,929; 5,739,754; 5,767,789; 5,777,561; 5,786,626; 5,812,065; and 5,821,859. U.S. Patent applications assigned to the assignee of the present invention include: application No. 08/626,820, filed: Apr. 3, 1996, entitled "Method of Transporting RF Power to Energize Radio Frequency Transponders", by Heinrich, Zai, et al.; application Ser. No. 08/694,606 filed Aug. 9, 1996 entitled RFID System with Write Broadcast Capability by Cesar et al. ; application Ser. No. 08/681,741 filed Jul. 29, 1996 entitled RFID Transponder with Electronic Circuitry Enabling and Disabling Capability, by Heinrich, Goldman et al.; and application Ser. No. 09/153,617, filed Sep. 15, 1998, entitled RFID Interrogator Signal Processing System for Reading Moving Transponder, by Zai et al. The above identified U.S. Patents and U.S. Patent applications are hereby incorporated by reference.

BACKGROUND OF THE INVENTION

RF Tags can be used in a multiplicity of ways for locating and identifying accompanying objects, items, animals, and people, whether these objects, items, animals, and people are stationary or mobile, and transmitting information about the state of the of the objects, items, animals, and people. It has been known since the early 60's in U.S. Pat. No. 3,098,971 by R. M. Richardson, that electronic components on a transponder could be powered by radio frequency (RF) power sent by a "base station" at a carrier frequency and received by an antenna on the tag. The signal picked up by the tag antenna induces an alternating current in the antenna which can be rectified by an RF diode and the rectified current can be used for a power supply for the electronic components. The tag antenna loading is changed by something that was to be measured, for example a microphone resistance in the cited patent. The oscillating current induced in the tag antenna from the incoming RF energy would thus be changed, and the change in the oscillating current led to a change in the RF power radiated from the tag antenna. This change in the radiated power from the tag antenna could be picked up by the base station antenna and thus the microphone would in effect broadcast power without itself having a self contained power supply. In the cited patent, the antenna current also oscillates at a harmonic of the carrier frequency because the diode current contains a doubled frequency component, and this frequency can be picked up and sorted out from the carrier frequency much more easily than if it were merely reflected. Since this type of tag carries no power supply of its own, it is called a "passive" tag to distinguish it from an active tag containing a battery. The battery supplies energy to run the active tag electronics, but not to broadcast the information from the tag antenna. An active tag also changes the loading on the tag antenna for the purpose of transmitting information to the base station.

The "rebroadcast" or "reflection" of the incoming RF energy at the carrier frequency is conventionally called "back scattering", even though the tag broadcasts the energy in a pattern determined solely by the tag antenna and most of the energy may not be directed "back" to the transmitting antenna.

In the 70's, suggestions to use tags with logic and read/write memories were made. In this way, the tag could not only be used to measure some characteristic, for example the temperature of an animal in U.S. Pat. No. 4,075,632 to Baldwin et. al., but could also identify the animal. The antenna load was changed by use of a transistor. A transistor switch also changed the loading of the transponder in U.S. Pat. No. 4,786,907 by A. Koelle.

Prior art tags have used electronic logic and memory circuits and receiver circuits and modulator circuits for receiving information from the base station and for sending information from the tag to the base station.

The continuing march of semiconductor technology to smaller, faster, and less power hungry has allowed enormous increases of function and enormous drop of cost of such tags. Presently available research and development technology will also allow new function and different products in communications technology.

The physical size of radio frequency (RF) transponders is set by the size of the antenna used to pick up the RF signal from a base station when the antenna is "resonant" with the sent out signals. Resonant antennas are much more efficient than non resonant antennas in communicating between a base station and an RF tag.

An RF transponder placed on an RF conducting or absorbing object must in general be placed so that the antenna of the RF tag is separated from the conducting or absorbing material surface by from 1/10 to 1/4 wavelength of the RF energy. For example, at 2.45 Ghz, the wavelength of the RF waves is 12 cm in air. If the RF tag is separated from the surface by air, this means it must be 1.2 to 3 cm from the surface, and the usefulness of the transponder is limited.

A significant cost of an RF transponder is the connection of antennas to the semiconductor device which contains the non-volatile memory, logic, and RF circuitry necessary to communicate with a base station.

OBJECTS OF THE INVENTION

It is an object of the invention to provide an RF tag which may be placed in close proximity to a surface of a conducting or absorbing material.

It is an object of the invention to provide an RF tag having minimum dimensions.

It is an object of the invention to provide an RF tag having minimum cost.

SUMMARY OF THE INVENTION

The RF transponder of the invention uses a high dielectric constant material in cooperation with the tag antenna to reduce the distance of the antenna from a surface which is conducting or absorbing of the RF radiation.

The RF transponder of the invention uses a high dielectric constant material in cooperation with the tag antenna to reduce the dimensions of the tag antenna.

In particular, the innovative RF transponder of the invention uses a high dielectric constant material in cooperation with the tag antenna to reduce the dimensions of the tag antenna so that the antenna is no larger than the semiconductor device containing the tag electronics. In this way, the entire tag may be produced on a normal semiconductor production line using lithographic techniques well known in the art for forming metal lines and features, and connecting such metal lines and features to the semiconductor material or underlying metal features. In this way, the separate step of producing an antenna and bonding the antenna to the chip when the chip has been sawn from the wafer is avoided.

The transponder package may be sealed, e.g. encapsulated within ceramics.

In an illustrative embodiment the new RF tag includes a patch antenna connected through a three-section impedance matching circuit to an input of an RF tag integrated circuit (IC). The patch antenna, matching circuit, and RF tag IC are all affixed to one side of a dielectric substrate so that the packaged tag can receive a conductive surface at the opposite side of the substrate. The RF tag package may be coupled to an external conductive surface, not through a via, but through a quarter wave transformer which operates as an RF short to the external conductive surface.

Any device which may change the transponder antenna loading to modulate the tag backscatter is anticipated by the inventors. These include, but are not limited to, devices to measure temperature, pressure, velocity, acceleration, orientation, direction of travel, position, sound, light, chemical constitution, and or the gradients of the forgoing characteristics.

BRIEF DESCRIPTION OF THE DRAWINGS

The above and further features, aspects, and advantages of the invention will be apparent to those skilled in the art from the followed detailed description, taken together with the accompanying drawings in which:

FIG. 4 is an elevation view of the RF tag of FIG. 3 with the addition of a high dielectric constant material covering the antenna.

FIG. 5 is an elevation view of a semiconductor chip having an antenna no larger than the chip dimension imbedded in a high dielectric constant material.

FIG. 6 is an alternative embodiment of the RF tag on a chip structure of FIG. 5.

DETAILED DESCRIPTION OF THE INVENTION

Figure 1:
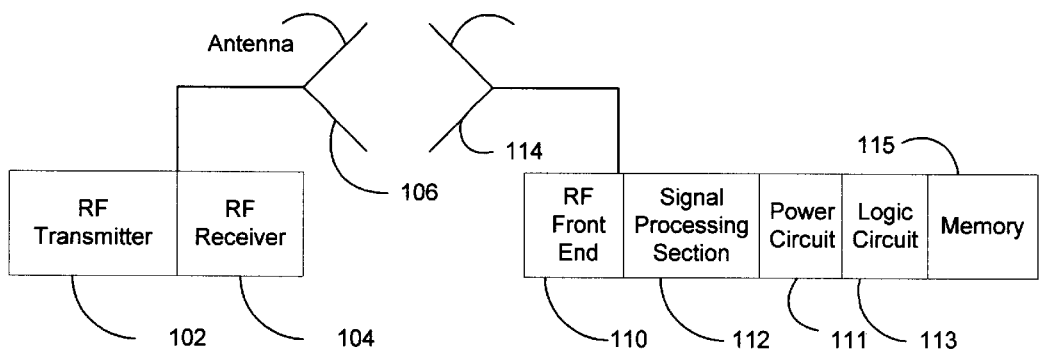
FIG. 1 is a conceptual block diagram of an RF system which includes a base station and RF tag containing a patch antenna with impedance matching circuit and dielectric substrate in accordance with the principles of the invention.

A radio-frequency (RF) transponder (tag) package in accordance with the principles of the invention includes a resonant patch antenna. In a first illustrative embodiment, a patch antenna, an impedance matching circuit, and RF circuitry are formed on one surface of a dielectric substrate. A ground plane on the other side of the dielectric material may be exposed for contact with a conductive surface external and separate from the package, or the external surface of an external object may provide the only ground plane. In the first illustrative embodiment, the new RF tag package includes a substrate of high dielectric constant having an integrated circuit (tag IC) mounted on one surface of the dielectric. The tag IC package includes RF tag electronics and is electrically connected to an impedance matching circuit printed on the same side of the dielectric. The matching circuit is electrically connected to a patch antenna that is printed on same side of the dielectric as the tag IC and matching circuit. A ground plane may be printed on the opposite side of the dielectric. In the first embodiment, the high dielectric substrate has a thickness sufficient to space the antenna and the ground plane the requisite 1/10 to 1/4 wavelengths apart, where now the wavelength is the wavelength of the RF electromagnetic waves in the high dielectric constant material. Since the high dielectric constant material may have a dielectric constant preferably greater than 10, more preferably greater than 20, even more preferably greater than 50, and most preferably greater than 100, and since the wavelength of the RF waves in the dielectric scales inversely as the square root of the dielectric constant, the distance between the ground plane and the resonant antenna may be less than 1/10 the thickness required if the space were air.

The matching circuit of the first embodiment is typically made of microstrip line sections connected in series and/or in parallel, and the ground plane on the opposite side of the dielectric is part of the microstrip line structure. Since, in the illustrative embodiment, the antenna, the impedance matching circuit and tag IC are all located on the same side of the dielectric material, the expense and inconvenience of using a "via" to feed the antenna conductor from one side of the dielectric material to the other is avoided. Additionally, a quarter wave transformer is connected to provide an "RF short" to the reference, or ground, plane on the opposite side of the dielectric material from the side to which the patch antenna, matching circuit, and RF circuitry are affixed. In this manner, a completely via-free RF tag package, with the attendant benefits of low manufacturing costs and high mechanical reliability, may be produced. The ground plane may be attached to the high dielectric constant and to the tag, or the ground plane may be the surface of a conducting material to which the tag is attached.

In a second illustrative embodiment, the RF tag of the first embodiment has additionally a novel covering of high dielectric material over the tag antenna. When a resonant antenna is formed on a high dielectric constant material substrate, the dimensions of the antenna are reduced somewhat from the dimensions that a antenna resonant at the same frequency would have in air. However, the calculation of the antenna dimensions is complicated and the precise field distributions in the air and in the dielectric must be taken into account. However, when approximately a half wavelength of high dielectric constant material is placed over the antenna, the antenna acts nearly as if it were buried in the dielectric, and the resonant antenna dimensions scale inversely as the square root of the dielectric constant.

Supposing a dielectric constant of 100 and a frequency of 100 GHz, the antenna dimensions for a patch antenna are reduced by a factor approximately 400 over the antenna dimensions in air. In this case, an RF tag resonant antenna may be no larger than the semiconductor chip used to provide the tag electronics, and the antenna may be fabricated in a third embodiment in the same production line as the semiconductor device, using the same technology as is normally used to connect various components on the chip. Since the packaging and connections of a chip to external leads may easily be much greater than the cost of the chip, the cost savings will be substantial.

A preferred embodiment uses a full wave loop antenna, which would be optimized for use in air at 2.4 Ghz at a diameter of 3.9 cm placed 1.2 cm from a ground plane, and hence at 2.4 Ghz and surrounded by a material with dielectric constant of 100 would have dimensions of 3.9 mm and would be placed 1.2 mm from a ground plane. If the antenna is produced to be resonant at higher frequencies, the size of the antenna would be correspondingly less.

In general, the power absorbed by the RF tag is proportional to the square of the antenna length, and hence the power absorbed will be reduced by a large factor. The read range and the writing range of the tag will be reduced proportionally, but may still be in the range of a few cm. for broadcast powers of approximately one watt, which for many applications is sufficient. In applications where the tag is in a completely enclosed environment, the broadcast power is not limited by government regulation, and the read write range may be in the range of meters. For example, the RF power density in the interior of a common microwave oven may be 5 orders of magnitude greater than the power radiated by a base station, and is quite sufficient to fry a chip which has a resonant antenna.

Antenna structures and impedance matching schemes are disclosed in great detail in incorporated application Nos. 09/191,642 and 09/191,641.

Fabrication of dense polycrystalline high dielectric material requires fine powders or powder blends. The process may begin with pre-manufactured material. If the materials available are not of sufficient fineness, then a milling, sintering, and grinding process is first carried out. We processed barium titanate (BTO) and strontium titanate (STO) mixtures by ball milling in a commercial "Micronizer Mill" made by McCrone Instruments, using a $ZrO_2$ grinding balls to minimize contamination during the blending an grinding. We next sintered the ground material at 1550 C. Then we isostatically pressed the green ceramic body to achieve good intergrowth or solid solution formation of the blend to produce the material. The material was then ground by ball milling to one to two micron size, and mixed with a carrier as described below.

The preferred method of fabrication of a high dielectric constant material on a substrate is to mix nominally 28.1 grams of one micron particle size BTO and STO blends to a premixed solution of 4.5 grams of Sylgard 184 (part A) and 0.1 grams on a nonionic surfactant diluted in about 10 ml of Toluene. A dispersion was then formed by continuous mixing with a high speed/high shear mixer at approximately 5000 RPM for 15 minutes. The aerated mixture was defoamed in vacuum or allowed to degas over time. Then, 0.5 grams of Sylgard 184 (part B) was added and mixed by stirring. The mixture was then applied to our substrate, heated to 100 C for 1 hour to allow solvent evaporation. This was followed by a cure cycle of 200 to 300 C for 1 hour.

The dielectric constants of the mixtures formed by the above process were measured at 400 MHz to be between 64 and 100. Alternatively, 6.0 grams of Cfx (Accufluor 2028 supplied by Allied Signal) was dispersed into a premixed solution of 4.5 gram Sylgard 184 (Part ), 0.06 gram of GAFAC surfactant, and 50 ml toluene. The mixture and film were processed as above except that the film was cured at 300 C for 1 hour to achieve a high dielectric constant.

The inventors anticipate that the techniques known in the art of silicon processing may be used to provide high dielectric constant films on the surface of a processed silicon wafer. Such high dielectric constant films have been investigated for the purpose of providing high capacitance capacitors for the semiconductor devices. The problems of making such films very thin (10 nm) and pinhole free, as are necessary for such capacitors, disappear when the films are very thick (many microns) for use for dielectric material surrounding resonant RF antenna structures. In particular, ferroelectric crystalline substances which have dielectric constants higher than 1000 to 10000 are anticipated.

The descriptions of various antennas are given in great detail in incorporated Application No. 09/191,642. The addition of a high dielectric constant layer is given in incorporated Provisional Application No. 60/070,117. The ground plane, if present, may be essentially exposed at one side of the RF tag package so as to essentially be indistinguishable from a conductive surface of an external object with which the tag package may mate in use. Alternatively, the external conductive surface external to the tag package may be the only ground plane present.

FIG. 1 is a conceptual block diagram of an RF transponder system. An RF base station 100 includes an RF transmitter 102 and receiver 104, and an antenna 106 connected to the transmitter 102 and receiver 104. An RF tag 116 such as may be used in conjunction with the base station 100 includes an RF front end 110, a signal processing section 112, and an antenna 114. A patch antenna used for antenna 114 permits the RF tag to be both compact and inexpensive.

In operation, the base station 100 interrogates the tag 116 by generating an RF signal having a carrier frequency $f_c$. The carrier frequency $f_c$ is chosen based on a number of factors known in the art, including the amount of power permitted at that frequency by government regulation. In the United States, the federal communications commission (FCC) determines the regulations. The RF signal is coupled to the antenna 106 and transmitted to the tag 116. The RF signal emitted by the antenna 106 will, ostensibly, be received by the tag antenna 114 and, if the RF signal field strength sufficient, the RF tag will respond by modulating the impedance shown to the tag antenna 114. The modulated impedance will cause the tag antenna to modulate the backscattered radiation from antenna 114, which may be received by the base station antenna and received and demodulated by the base station receiver 104. In the case of a passive RF tag, all power to run the tag electronics comes from the RF signal received by the tag antenna 114 and rectified by a tag rectification circuit power circuit 111. In other cases, a battery may replace the tag power circuit 111. A tag logic circuit 113 and a tag non-volatile memory 115 are shown for the normal case that the tag carries information which must be stored and acted upon. In some cases, the tag does not need the tag non-volatile memory and the tag logic circuit, and the tag merely measures something and modulates the antenna 114 backscatter to transmit information to the base station. The tag front end 110, signal processing section 112, power circuit 111, logic circuitry 113, and non volatile memory 115 are normally formed as an integrated circuit (IC) from a chip of semiconductor material such as silicon or gallium arsenide, but in some cases may be formed from multiple chips or of other materials such as silicon germanium alloy semiconductors.

Figure 2:
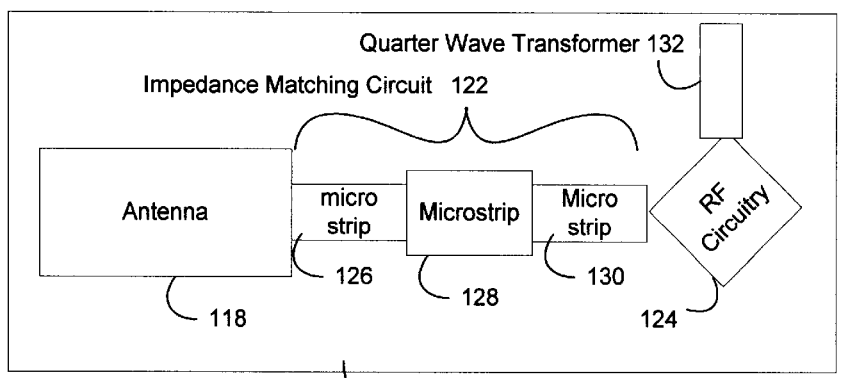
FIG. 2 is a top plan view of an tag that includes a patch antenna.

FIG. 2 shows a plan view of an illustrative embodiment of an RF tag in accordance with the principles of the present invention. The RF tag 116 includes an antenna 118 which may be formed of a layer on conductive material, such as copper, deposited in any variety of patterns as disclosed in great detail in incorporated application Nos. 09/191,642 and 09/191,641. The antenna shown in FIG. 2 is a patch antenna. An impedance matching circuit 122 includes three microstrip sections 126, 128, and 130 connected in series matches the impedance of antenna 118 to that of the RF circuitry 124. The antenna 118, impedance matching circuit 122, and tag IC are shown mounted on one side of a substrate 120, which is composed of a high dielectric constant material. Normal printed circuit board materials such as FR-4 have dielectric constants about 3.7. Flex circuits printed on polyimide have lower dielectric constants. Great efforts are made in the electronics industry to produce low dielectric constant materials to speed the signals along conducting lines laid on and in the dielectric. For the purposes of this disclosure, the dielectric constant of the substrate 120 has a high dielectric constant, preferably higher than 10, more preferably greater than 20, even more preferably greater than 50, and most preferably greater than 100.

The patch antenna 118 shown, and the impedance matching system 122, must have a ground plane opposite the antenna structure shown on FIG. 2 for the circuitry to work optimally. The ground plane should have a separation at least 1/10 wavelength from the antenna structure 118. If the substrate material 120 has a high dielectric constant, it may be thinner to satisfy the 1/10 wavelength criterion, since the wavelength of the radio frequency waves in the dielectric material are inversely proportional to the square root of the dielectric constant.

In the embodiment sketched in FIG. 2, the ground connection to the IC is formed to a quarter wavelength transformer 132, which acts as an RF short to ground. Such a transformer is used to avoid connecting the IC to the ground through a "via", or hole, in the substrate 120.

Figure 3:
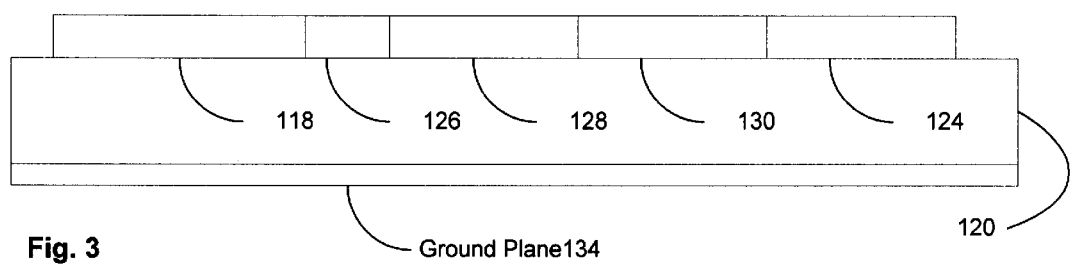
FIG. 3 is an elevation view of the RF tag illustrated in the top plan view of FIG. 2.

FIG. 3 shows an elevation view of the patch antenna RF tag shown in plan view in FIG. 2. In this elevation view, a ground plane 134 is shown attached to the substrate 120. Such a ground plane may be dispensed with if the tag is to be attached to an electrically conducting material such as a metal. Alternatively, the ground plane 134, may be constructed attached to the substrate 120, and the entire tag attached to a conducting metal surface or to a surface of an RF absorbing material. The tag IC is shown in FIG. 2 as being the same height as the conducting material of the patch antenna 118 and the impedance matching circuit 122. In actual fact the tag IC would be much thicker than the printed circuit metallization normally used on printed circuit boards.

FIG. 4 shows an embodiment of the invention where the tag shown in FIG. 3 has an additional layer 136 of high dielectric material deposited over the conducting material of the patch antenna 118 and the impedance matching circuit 122. As the layer 136 is made thicker, the dimensions of the patch antenna 118 and the impedance matching circuit 122 may be reduced while still keeping the antenna 118 resonant with the same frequency RF signal.

FIG. 5 shows the most preferred embodiment of the invention. A semiconductor material 500 is formed as an IC by the usual processes of providing various devices 510 on a surface (here shown hugely magnified in relation to the dimensions of the IC). FIG. 5 may show a single chip or a part of a large wafer. The parallel layers 520 schematically show the many layers of insulator and conducting metal lines and vias of a conventional IC. A conducting ground plane 570 is optionally formed over layers 520, and a high dielectric material layer 530 formed on the conducting ground plane 570. An antenna structure 540 is shown schematically separated from the ground plane 570 by the high dielectric constant material 530, and a conducting via 560 is shown connecting the IC with the antenna 540. Finally, over the top of the antenna 540, a layer of high dielectric constant material 550 is laid to reduce the size of the antenna required to be resonant with the RF field.

FIG. 6 shows an alternative embodiment of the RF tag on a chip structure of FIG. 5. The final layer 550 is replaced by a high dielectric constant material 610 which is formed around the entire chip and antenna after the chip has been sawn from the wafer. The material 610 forms both a high dielectric constant material to optimize the antenna size, and to encapsulate and protect the chip. A further layer of material (not shown) may be formed around material 610 in the case that material 610 does not form a hermetic seal.

The structure shown in FIG. 5 is advantageously constructed in one continuous production line in a semiconductor manufacturing fabrication plant. The entire semiconductor wafer may be handled at one time, and the vias 560 formed by normal semiconductor processing.

The teachings of incorporated Provisional Application No. 60/070,117 are applied as exemplary modifications of the RF tags of each of the incorporated applications No. 09/191,641 and 09/191,642. The foregoing description of specific embodiments of the invention has been presented for the purposes of illustration and description. It is not intended to be exhaustive or to limit the invention to the precise forms disclosed, and many modifications and variations are possible in light of the above teachings. The embodiments were chosen and described to best explain the principles of the invention and its practical application, and to thereby enable others skilled in the art to best utilize the invention. It is intended that the scope of the invention be limited only by the claims appended hereto.

We claim:

1. A radio frequency transponder (RF tag), comprising:
   an antenna for communicating RF signals between the RF tag and a base station, the RF signals having a wavelength in free space;
   an apparatus connected to the antenna, the apparatus for modulating the backscattering from the antenna; and
   a high dielectric constant material operatively cooperating with the antenna to reduce the RF tag dimensions for optimally communicating RF signals between the RF tag and the base station.

2. A radio frequency transponder (RF tag), comprising:
   an antenna for communicating RF signals between the RF tag and a base station, the RF signals having a wavelength in free space;
   at least one semiconductor device connected to the antenna, the semiconductor device having a rectification power stage for rectifying signals from the antenna and powering the semiconductor device, a non-volatile memory, and logic circuits for receiving and sending signals from and to the antenna and for reading and writing from and to the non-volatile memory; and a high dielectric constant material operatively cooperating with the antenna to reduce the RF tag dimensions for optimally communicating RF signals between the RF tag and the base station.

3. The RF tag of claim 2, wherein the high dielectric constant material has a thickness of less than one-quarter of the wavelength of the RF signal in free space.

4. The RF tag of claim 3, wherein the high dielectric constant material has a thickness of less than one-eighth of the wavelength of the RF signal in free space.

5. The RF tag of claim 2, wherein the high dielectric constant material has a thickness of less than one-quarter of the wavelength of the RF signal in free space and is interposed between the antenna and an external electrically conducting surface.

6. The RF tag of claim 2, further comprising an electrically conducting material, wherein the high dielectric constant material has a thickness of less than one-quarter of the wavelength of the RF signal in free space and wherein the high dielectric constant material is interposed between the antenna and the electrically conducting material.

7. The RF tag of claim 2, wherein the maximum dimension of the antenna is less than the maximum dimension of the semiconductor device.

8. The RF tag of claim 7, wherein the antenna is connected to the semiconductor device before the semiconductor device is separated from a wafer used in the production of the semiconductor device.

9. The RF tag of claim 7, wherein the high dielectric constant material is applied to the semiconductor device before the semiconductor device is separated from a wafer used in the production of the semiconductor device.

10. The RF tag of claim 2, wherein the high dielectric constant material has dielectric constant greater than 20.

11. The RF tag of claim 10, wherein the high dielectric constant material has dielectric constant greater than 50.

12. The RF tag of claim 11, wherein the high dielectric constant material has dielectric constant greater than 100.

13. A semiconductor wafer, comprising:

at first large plurality of discrete semiconductor devices, each discrete semiconductor device having a rectification power stage for rectifying signals from an antenna and powering the semiconductor device, a non-volatile memory, and logic circuits for receiving and sending signals from and to the antenna and for reading and writing from and to the non-volatile memory;

a second large plurality of antennas, each of the antennas connected to one of the discrete semiconductor devices, and a high dielectric constant material operatively cooperating with the antennas and semiconductor devices to form RF tags having dimensions for optimally communicating RF signals between the RF tag and a base station.

14. The semiconductor wafer of claim 13, wherein a high dielectric constant material is applied as a first layer to the semiconductor after the semiconductor devices have been fabricated, and wherein the antenna structures are fabricated on the first layer and connected to the semiconductor devices, and wherein a second layer of a high dielectric constant material is applied over the antenna structures.

15. The semiconductor wafer of claim 14, wherein the second layer has a thickness greater than one quarter the wavelength of the RF signals in the dielectric material of the second layer.

16. The semiconductor wafer of claim 15, wherein the second layer has a thickness greater than one half the wavelength of the RF signals in the dielectric material of the second layer.

17. The semiconductor wafer of claim 13, wherein the high dielectric constant material has a dielectric constant greater than 20.

18. The semiconductor wafer of claim 17, wherein the high dielectric constant material has a dielectric constant greater than 50.

19. The semiconductor wafer of claim 18, wherein the high dielectric constant material has a dielectric constant greater than 100.

* * * * *